Aug. 15, 1933.  E. NORDSTROM  1,922,818
FRUIT CUTTING AND JUICE EXTRACTING MACHINE
Filed Oct. 4, 1929  13 Sheets-Sheet 1

INVENTOR
Elof Nordstrom
BY
Frank H. Cent
ATTORNEY

Aug. 15, 1933.  E. NORDSTROM  1,922,818
FRUIT CUTTING AND JUICE EXTRACTING MACHINE
Filed Oct. 4, 1929   13 Sheets-Sheet 6

INVENTOR
Elof Nordstrom
BY
Frank J. Kent
ATTORNEY

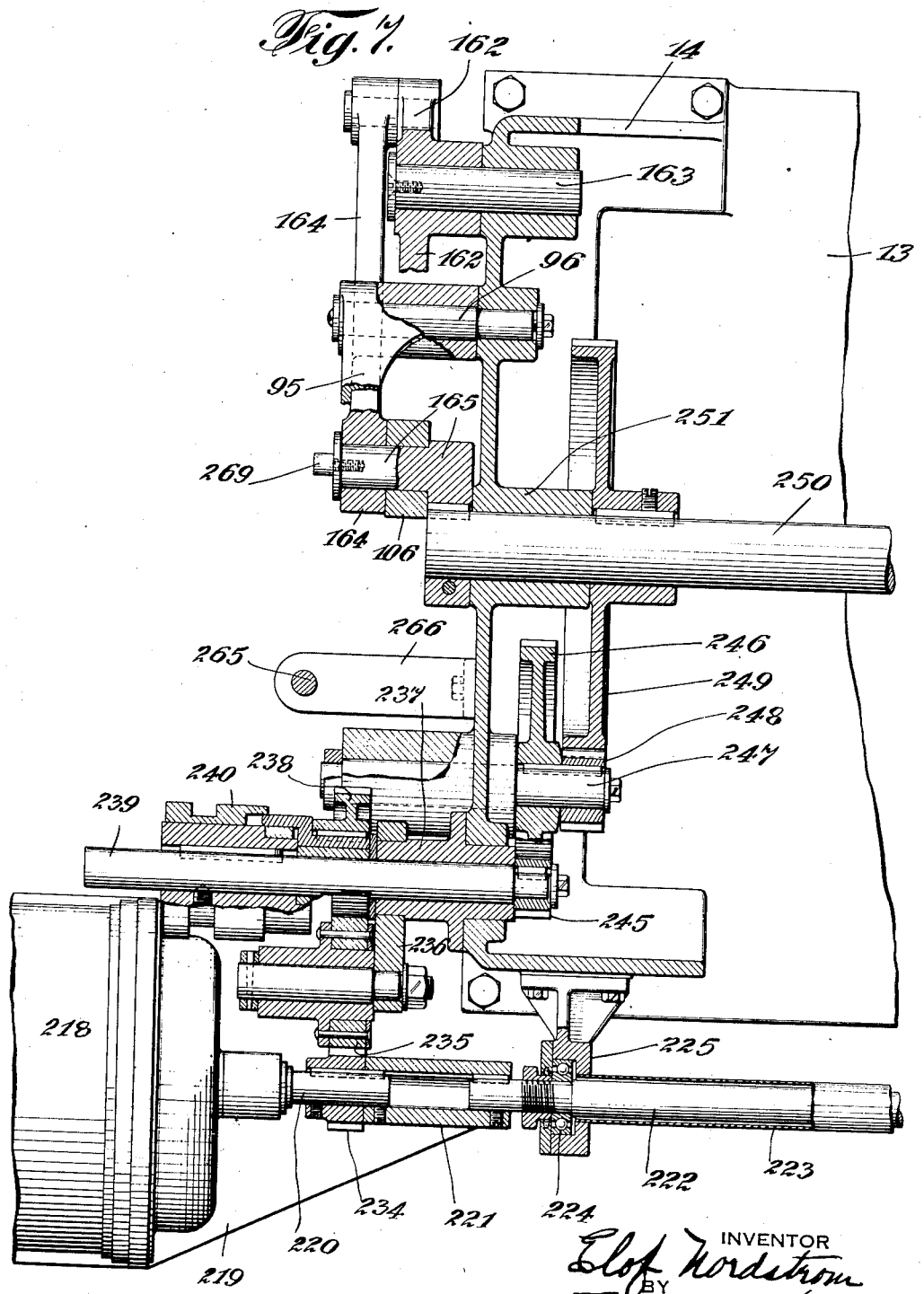

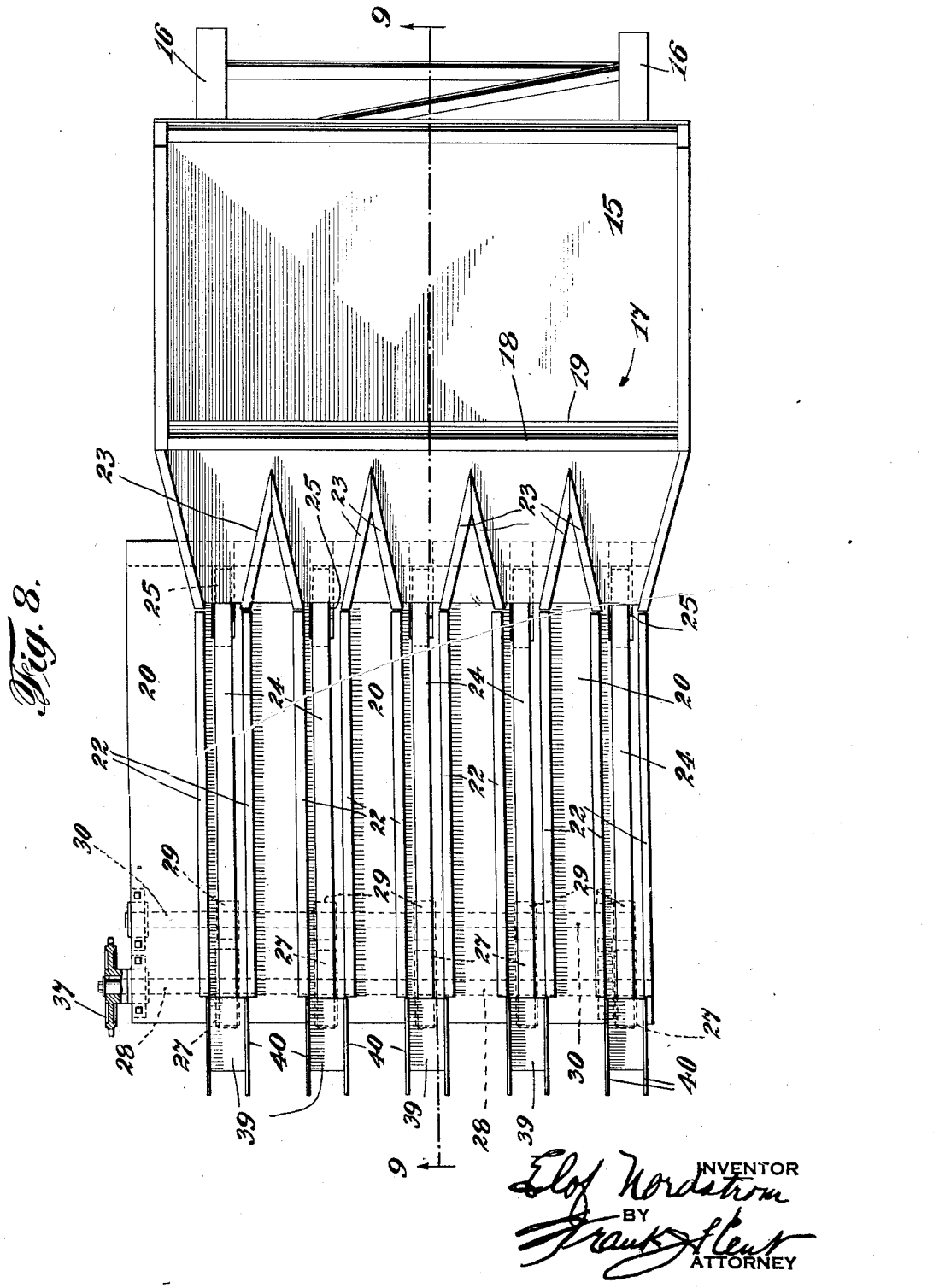

Aug. 15, 1933.   E. NORDSTROM   1,922,818
FRUIT CUTTING AND JUICE EXTRACTING MACHINE
Filed Oct. 4, 1929    13 Sheets-Sheet 9
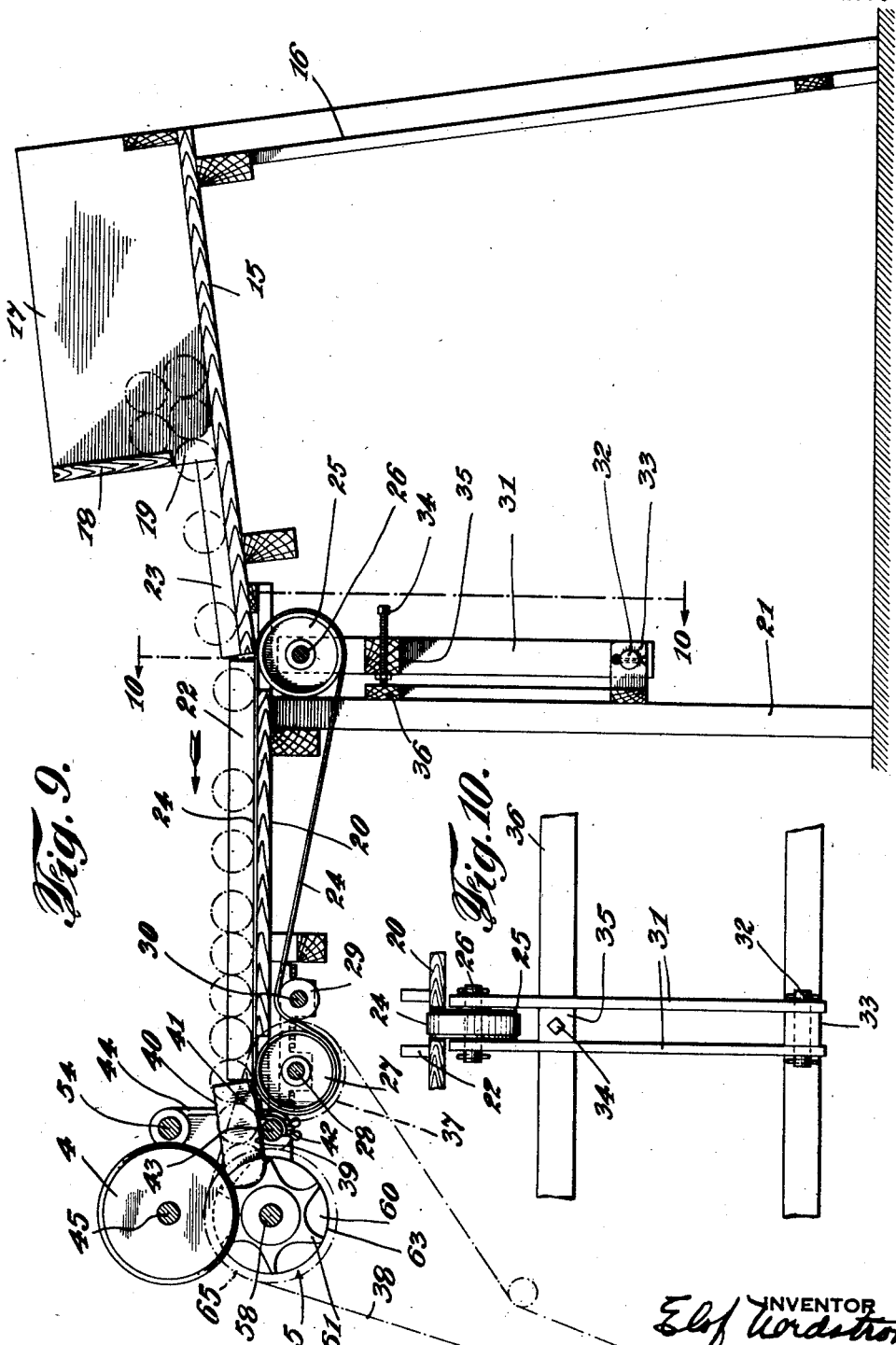

Aug. 15, 1933.  E. NORDSTROM  1,922,818
FRUIT CUTTING AND JUICE EXTRACTING MACHINE
Filed Oct. 4, 1929  13 Sheets-Sheet 10
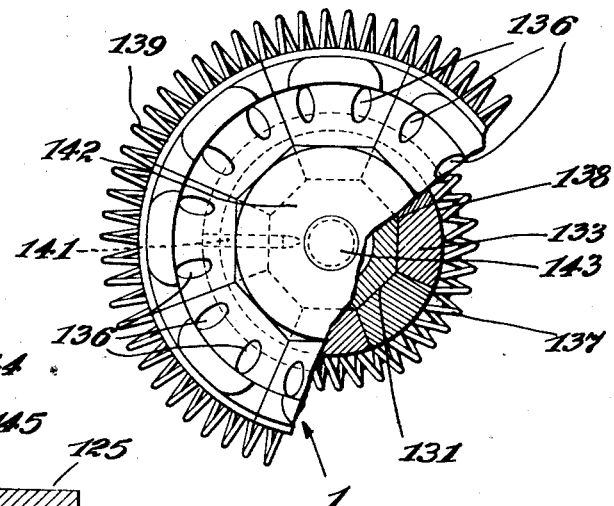
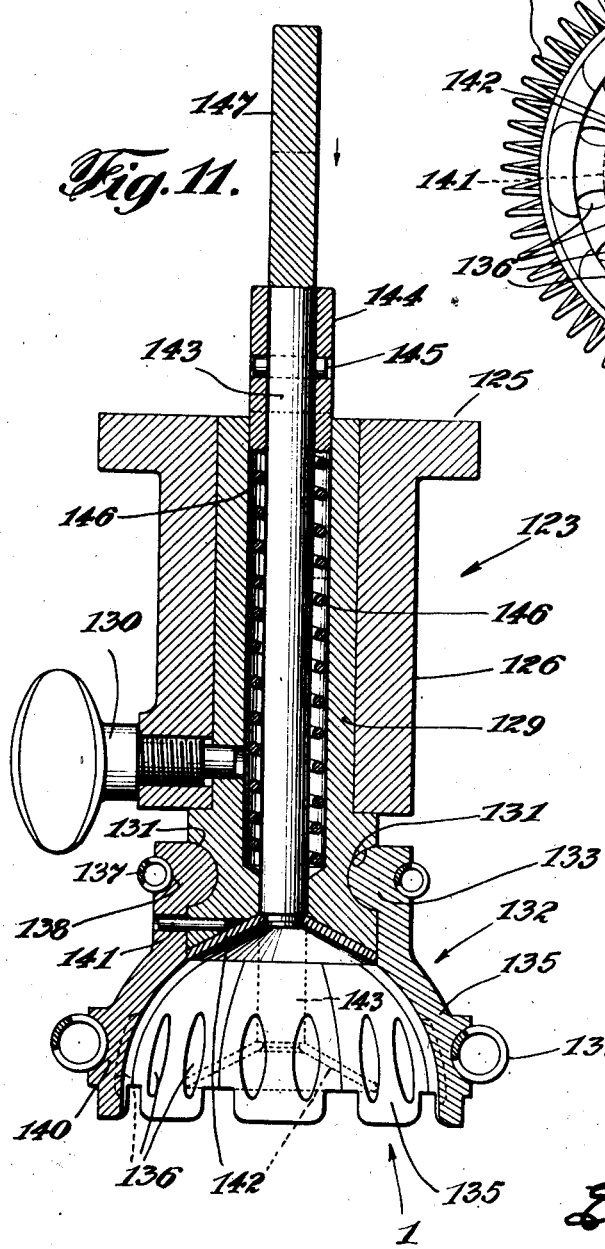
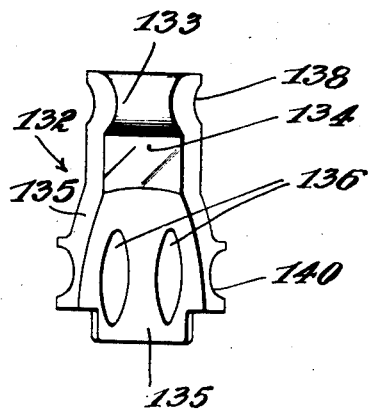

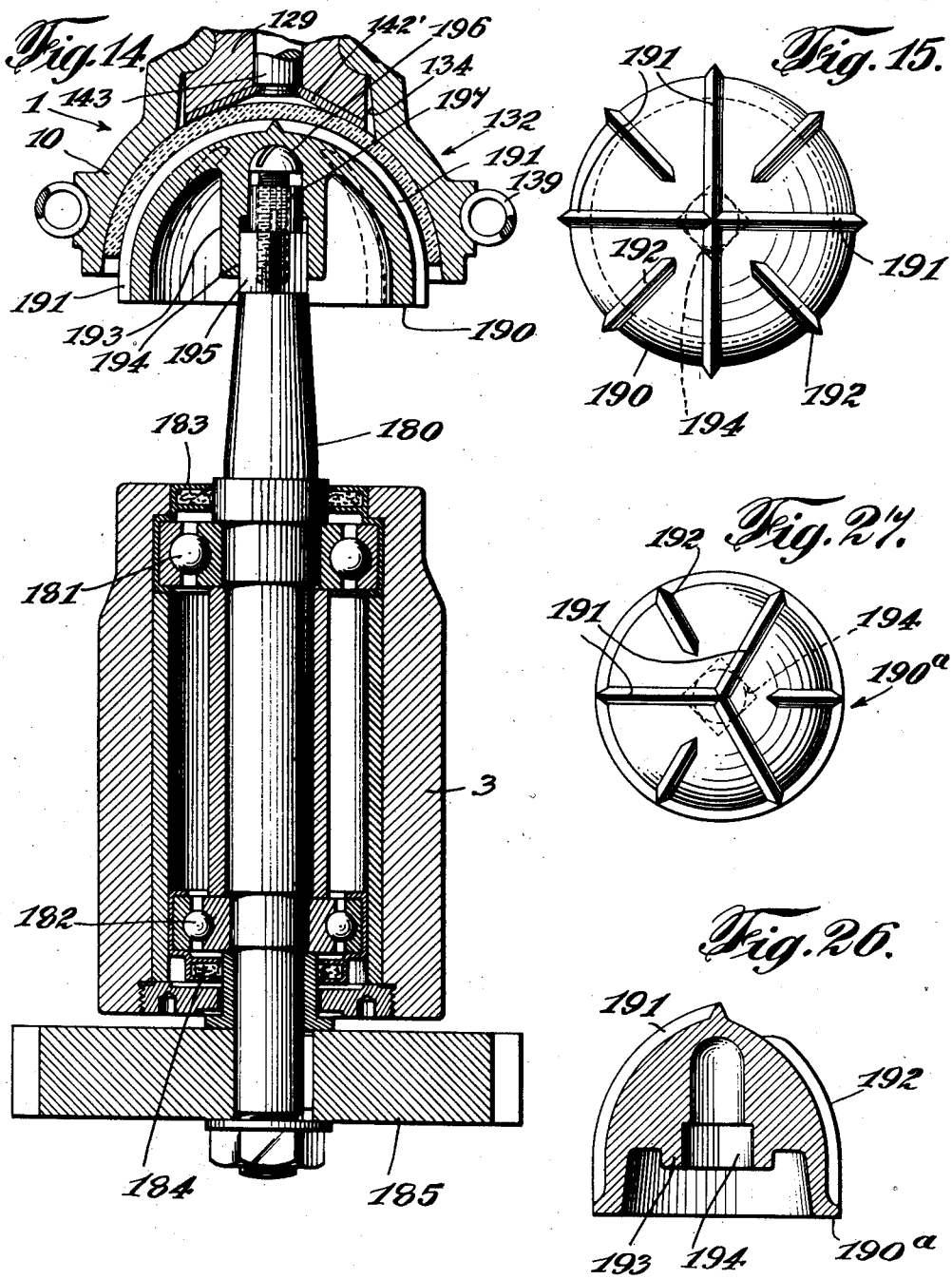

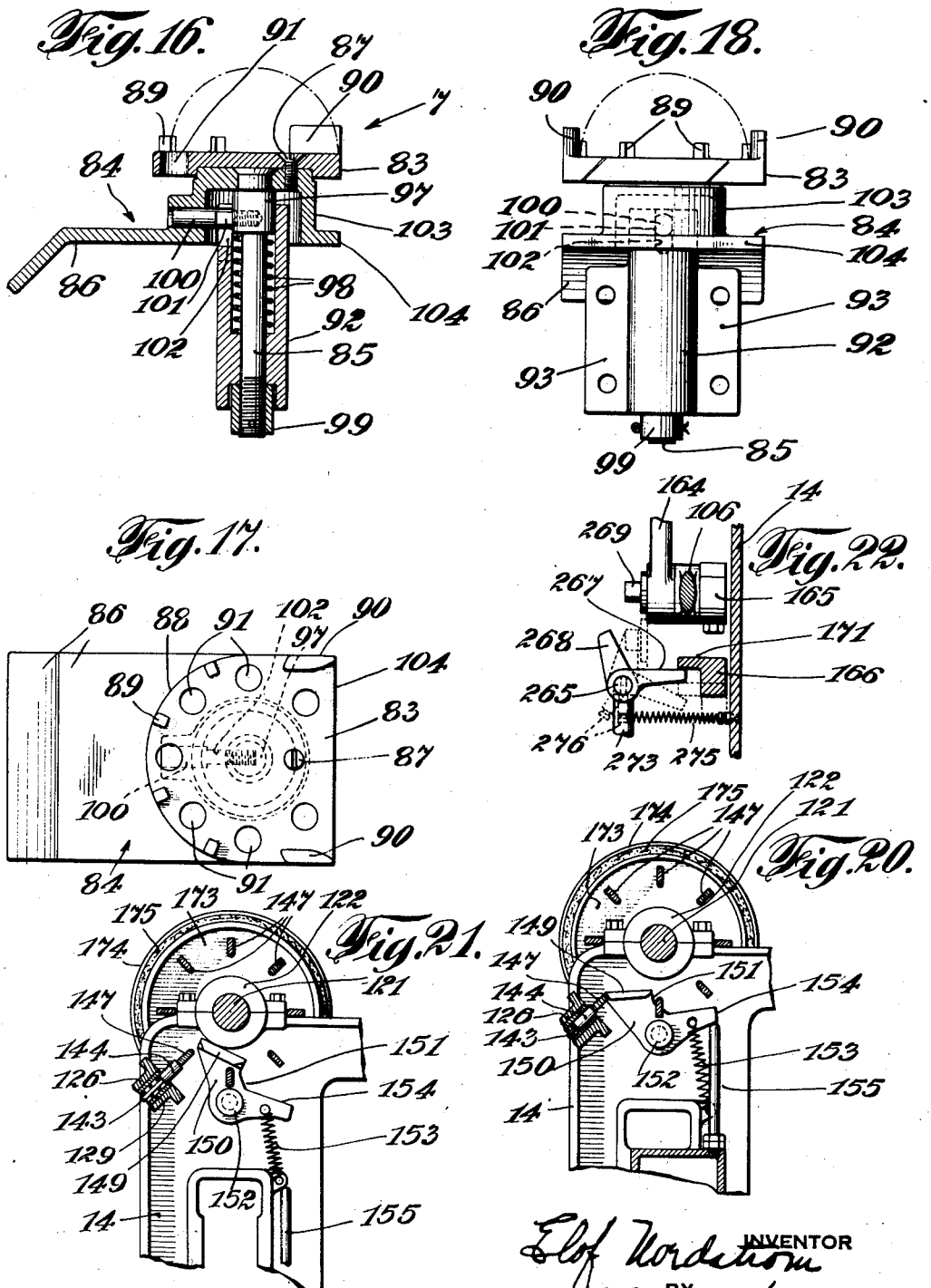

Aug. 15, 1933.  E. NORDSTROM  1,922,818
FRUIT CUTTING AND JUICE EXTRACTING MACHINE
Filed Oct. 4, 1929  13 Sheets-Sheet 13
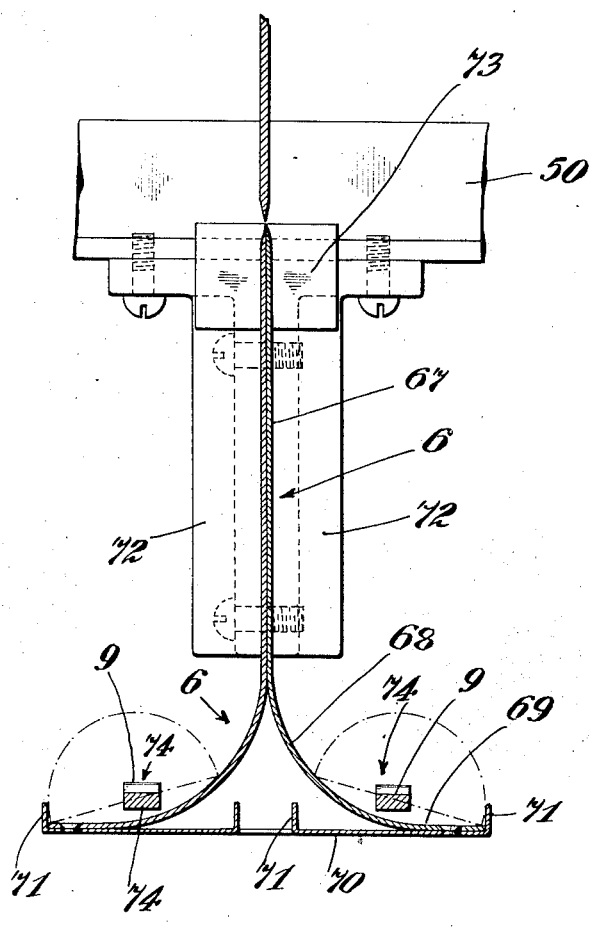
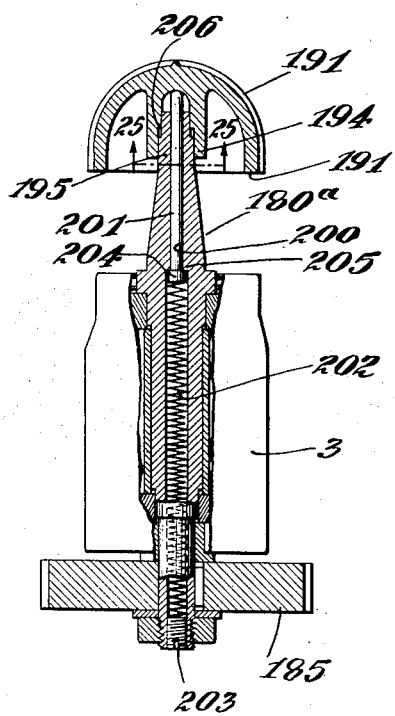
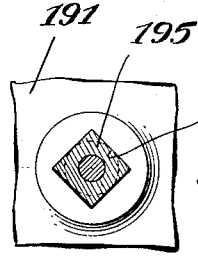
INVENTOR
Elof Nordstrom
BY
Frank J. Hunt
ATTORNEY Patented Aug. 15, 1933

1,922,818

UNITED STATES PATENT OFFICE 1,922,818

FRUIT CUTTING AND JUICE EXTRACTING MACHINE

Elof Nordstrom, East Orange, N. J., assignor to Hoffman Beverage Company, Newark, N. J., a Corporation of New Jersey Application October 4, 1929. Serial No. 397,258

31 Claims. (Cl. 146—3)

My invention relates to machines for cutting fruits, and especially citrus fruits, in pieces and for extracting the juice from the pieces by a rotary scraping or reaming operation.

The general purpose is to provide a machine of this general character which will handle a large number of fruits and produce a large volume of juice per unit time. A more particular object is to provide fruit-half supporting and reaming mechanism which will extract practically all the juice and pulp without removing any, or any appreciable amount, of the pectin or white fibrous inner portion of the rind. A further object is to provide a machine which is adapted or readily adaptable to handling citrus fruits of different types, such for example as oranges, which are practically spherical, and lemons which are ovate or elongated.

The machine comprises a conveying or fruit feeding mechanism; rotary cutting holders; aligned rotary cutters to which a row of the whole fruits is properly delivered by the cutting holders and each fruit is cut in halves; guide plates which receive, direct and properly position the halves for further movement; transfer mechanism; means for placing the fruit halves in holders of the transfer mechanism; series of chucks in which the halves are inserted by the transfer mechanism a row at a time; a row of reamers which are brought into cooperation with the pulp of the fruit halves in rows successively positioned by the series of chucks; and a carry-off conveyor to which the rinds are delivered from the chucks.

Preferably the machine also includes provisions for properly collecting and delivering the juice from the zone of extraction to a suitable container or receiver positively actuated means for ejecting the skins from the chucks, safety mechanism for stopping the machine in case of possible derangements or abnormal conditions, and various other details of construction or arrangement, as fully described in the following detail description of the accompanying drawings, which show one representative embodiment of the invention.

After considering this example, skilled persons will understand that many variations may be made, and I contemplate the employment of any structures which are properly within the scope of the appended cliams.

In the drawings:

Fig. 7 is a section at 7—7, Fig. 2.

Fig. 8 is a top plan of the feed or fruit supply mechanism.

Fig. 9 is a section at 9—9, Fig. 8, showing also the cutters and adjacent parts of the machine proper.

Fig. 10 is a section detail at 10—10, Fig. 9.

Fig. 11 is an axial section, enlarged, of one chuck mechanism.

Fig. 12 is a bottom plan of Fig. 11, with some parts broken away and sectioned.

Fig. 13 is an elevation of one gripper forming a part of a chuck.

Fig. 14 is an axial section, on the same scale as Fig. 11, of one reaming mechanism, the reamer being shown in cooperation with a fruit-half supported in a chuck.

Fig. 15 is a top plan of a reamer head.

Fig. 16 is an axial section of one of the fruit-half transfer holders.

Fig. 17 is a top plan of the same.

Fig. 18 is a right side elevation.

Fig. 19 is a section at 19—19, Fig. 6 showing mainly one fruit-half guide mechanism in association with a segment of a knife.

Fig. 20 is a section at 20—20, Fig. 5.

Fig. 21 is a similar section, with the parts in a different position.

Fig. 22 is a section at 22—22, Fig. 2.

Fig. 23 is a sectional detail enlarged at 23—23, Fig. 4.

Fig. 24 is a section of a modified reaming mechanism.

Fig. 25 is a sectional detail at 25—25, Fig. 24.

Fig. 26 is an axial section of a modified scraper head, suitable especially for lemons.

Fig. 27 is a top plan of the same.

A principal feature of the machine is the fruit-half supporting and reaming mechanism, and other features or parts of the machine are designed principally for the proper supply of whole fruits, cutting them in halves, placing the halves in the supports or chucks, bringing the reamers into cooperation with the fruit halves to remove the pulp and juice, properly disposing of the juice, and discharging reamed skins to a carry-off conveyor.

Figure 1:
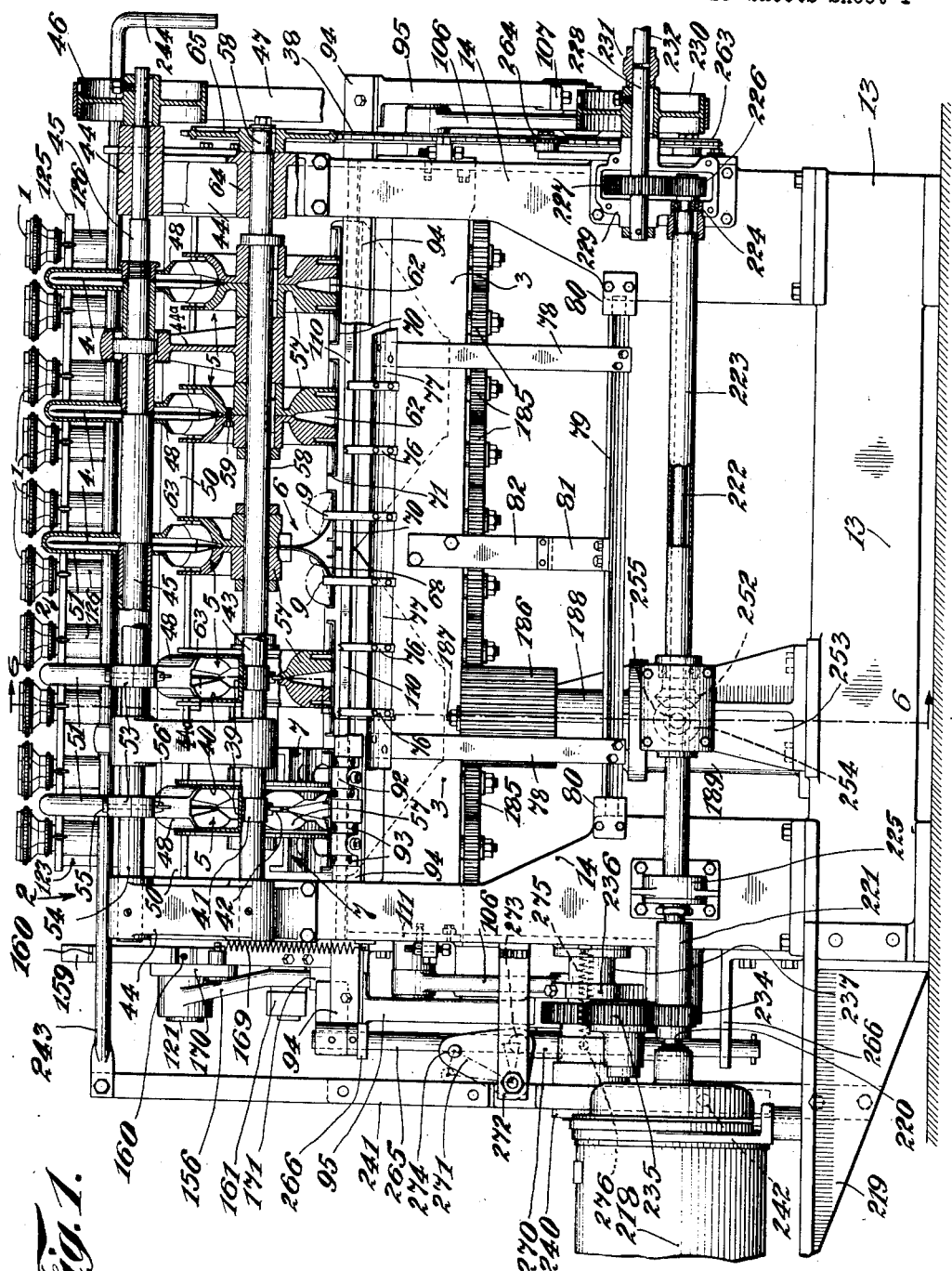
Fig. 1 is a view in front elevation, that is from the feed end of the machine, with the feed mechanism omitted, and with some parts in section.
Figure 6:
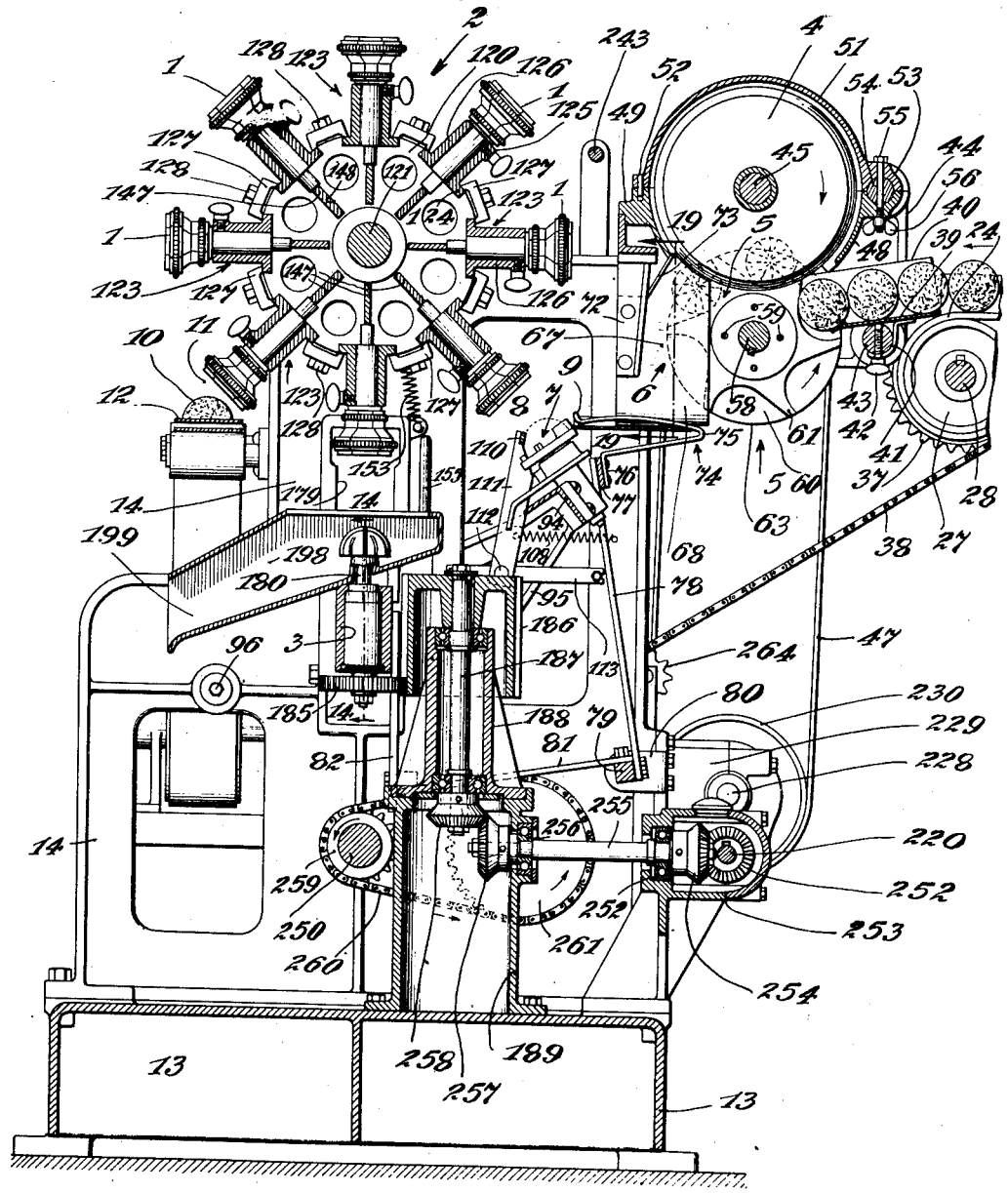
Fig. 6 is a section at 6—6, Fig. 1, with the parts in another position.

The fruit half supporting chucks 1 are arranged in a plurality of rows in a supporting drum or turret 2, Fig. 1, to 6.

The individual reaming mechanisms are arranged in a row in a carriage 3 reciprocated vertically in guides below the chuck turret. Anterior to the turret is a row of circular knives 4. Below the knives is a corresponding series of circular pocketed cutting holders 5 which receive the whole fruits and pass them in centered relation to the knives which cut them in halves. Between the cutting holders and the turret is a series of double guide plates 6 (see also Fig. 19) which receive, direct and position the cut halves for further advance. Adjacent the discharge ends of the guides is a row of transfer holders 7 supported on an oscillating frame. The transfer holders receive the halves from the guides and place them, one row at a time, in chucks located at the position 8, Fig. 6. A row of pushers 9 on an oscillating frame positively move the cut halves from the guides to the transfer holders. The reamed skins 10 are positively discharged from the chucks at the position 11, Fig. 6, to carry-off conveyor 12.

Figure 2:
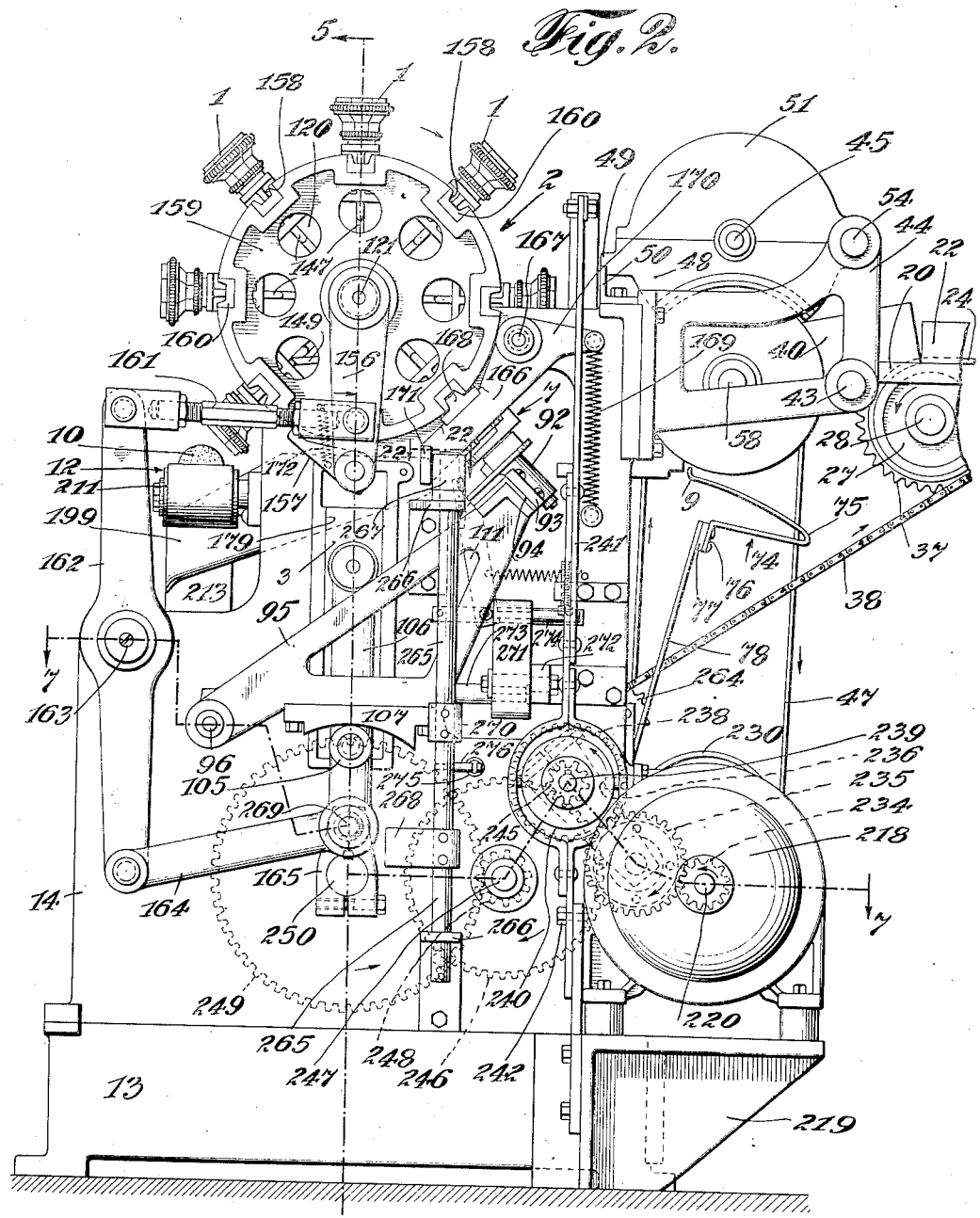
Fig. 2 is a left side elevation.
Figure 3:
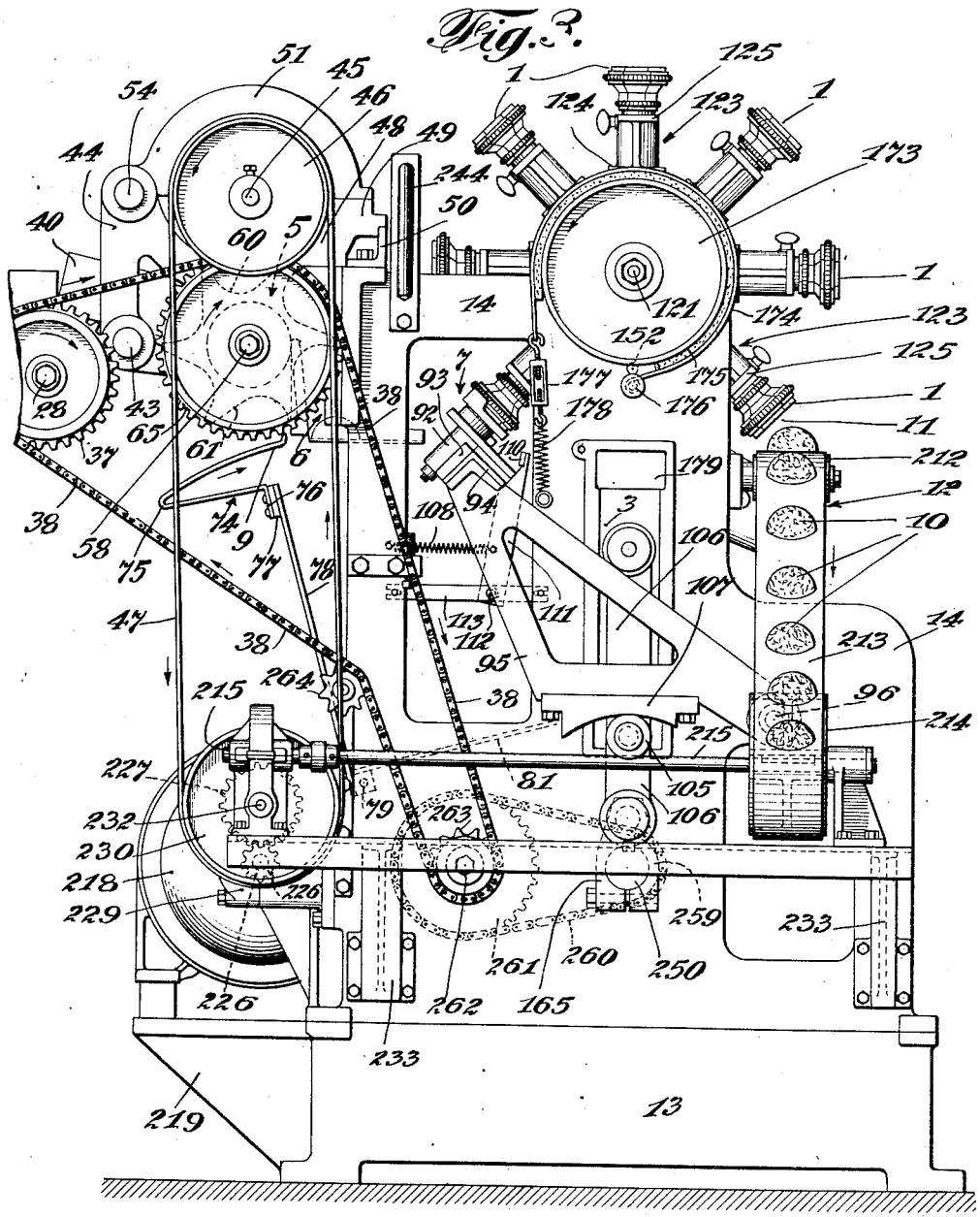
Fig. 3 is a right side elevation.

While the whole fruits might be placed in the cutting holders by hand, with omission of supply mechanism, this is usually impracticable because the machine is designed for large juice production and the handling of a considerable number of fruits at a time; and practically or entirely automatic supply mechanism is therefore provided, as shown principally in Figs. 8 and 9, the delivery end of this supply mechanism being also shown in Figs. 2, 3 and 6 in association with the cutters and cutting support mechanism.

The machine is designed for the handling of the whole fruits in successive aligned rows. As here shown, a row of five fruits at a time is presented to the cutters, but evidently, any reasonable number of fruits may be simultaneously handled by further duplication of the various mechanisms. Since each fruit is divided into halves by the cutters, the individual fruit handling parts of the various mechanism groups posterior to the cutters are double the number of cutters and cutting supports; that is, in this case, there are ten of each of the transfer pushers, transfer holders, chucks (in each row of chucks) and reamers.

The parts of the machine aside from the feed mechanism are supported in a frame comprising as principal parts a base 13 and side uprights 14.

The feed or supply mechanism, Figs. 8 and 9, comprises a table 15 supported by legs 16. At the forward end of the table is a box 17 in which the whole fruits are dumped. The table is inclined toward the machine proper, and the box has a backboard 18, the lower edge of which is spaced from the table to provide a gate 19 of vertical dimension slightly greater than the average size of the fruits. The table 15 may be conveniently identified as the initial or feed table. Its rear end is adjacent the forward end of a second table 20 which may be conveniently be identified as a conveyor table, and is supported by legs 21. The upper face of the conveyor table is divided into a row of channels formed by side boards 22, each channel being of width slightly greater than the average fruit diameter. On the upper surface of the rear portion of the feed table are guide boards 23 in V arrangement, providing rearwardly converging channels leading to the conveyor channels. As the fruits roll through the gate they are laterally divided or separated and pass practically one at time to each of the conveyor channels. Provision of the V guide boards and guide channels reduces to a minimum the services of an attendant in properly directing the fruits to initial ends of the conveyor channels.

A conveyor belt 24 moves over the table 20 centrally in each guide channel. At their forward ends, the belts are supported by pulleys 25 on short shafts 26 (see also Fig. 10). At their rear ends the belts pass about pulleys 27 on a shaft 28. Idler pulleys 29 may be provided on a shaft 30 adjacent the rear pulleys 27. Each of the forward belt shafts 26 is mounted in a frame comprising side members 31 pivotally mounted at 32 in brackets 33 carried by the supports 21. Each frame is adjusted for the individual adjustment of the belts by a screw 34 passing through a block 35 in the frame and engaging an abutment strip 36 on the supports 21. The conveyor belts are driven by a sprocket 37 on shaft 28 and a chain 38 which also has another driving function, as will appear. Complete driving connections or arrangements will generally be described after description of the principal features or groups of parts of the machine.

At the discharge end of each conveyor channel is a guide trough for directing the fruits to the pockets of a corresponding cutting holder or wheel 5. Each trough consists of a bottom plates 39, and side plates 40. The bottom plates are secured by clips 41 and screws 42 to a supporting cross bar 43.

The circular knives 4 are secured on a shaft 45 running in bearings in brackets 44ª, carried by cross bars 43 and 54. The shaft is driven at high speed by a pulley 46 on one end and a belt 47 from another pulley referred to later. Each knife is housed in a guard to catch the juice thrown off by the knife and to protect workmen. Each guide includes a lower section 48 open at the bottom and having at its rearward end a lug 49 secured on a cross frame member 50, and an upper continuous section 51, the front end of which is secured to the lower section by a pin 52 in lug 49; and the two sections have their forward ends socket formations 53 embracing a transverse supporting bar 54 and secured thereon by bolts 55, which may have wing nuts 56 for the quick removal and replacement of the guards, as for example when sharpening the knives.

Below the series of knives and adjacent the discharge ends of the guide troughs 39 are the rotary cutting supports on carriers 5. Each of these may for manufacturing convenience and economy be made in two halves 57, keyed on a shaft 58 and secured together by screws 59. The two halves of each cutting support are formed to provide a plurality of fruit receiving pockets 60, the fingers 61 forming the rearward side of each pocket in the direction of rotation being curved, and the discharge ends of the trough bottoms 39 being slotted to admit passage of these fingers. The pockets are thus arranged as clearly shown in Figs. 6 and 9 so that as they rise, each one takes the foremost fruit from the corresponding guide trough and carries it up to contact with the knife, which cuts through the center of the fruit, as clearly shown in Fig. 6. The lower segment of the knife is accommodated in an annular space 62 provided by the inner face formations of the sections of the cutting support 5 (see Fig. 1). Each section has at its outer face, a disk or flange formation 63 to retain the fruits against lateral displacement. The cutting support shaft 58 revolves in bearings 64 in a frame bracket 44 and intermediate brackets 44ª, and is driven by a sprocket 65 and a chain 38, which is the same chain that drives the conveyor belt shaft 28 as above referred to. The conveyor belts and cutting supports might otherwise be independently driven. The present arrangement of concurrent drive for the conveyors and cutting supports provides for proper supply of fruits to the pockets of the rotary supports, and when the drive ratio is properly determined it also provides for the proper supply of the fruit sections to the chucks, when each of the cutting supports 5 has six pockets as shown and the chucks are arranged on the chuck turret in eight rows, the drive rate of the cutting supports being in proper ratio to the rate of intermediate rotation of the turret, as later described. By suitable rearrangement of driving ratios, a different number of pockets might be provided in the cutting supports.

For each cutting support and knife, a pair of guide plates 6 is arranged as best shown in Figs. 1, 6 and 19, to receive the severed fruit-halves and guide and direct them for further movement. Each plate has vertical portions 67 extending upward in the aperture between the halves of the corresponding cutting support. These vertical portions are in contact, and below them each plate has a curved portion 68 flaring outward to a horizontal portion 69, these horizontal portions being secured to supporting plates 70. The side edges of the supporting plates are upturned, forming guide flanges 71, preventing laterally displacement of the fruit halves. The guide plates are secured to brackets 72 depending from the cross bar 50 above mentioned. Stop plates 73 (Figs. 6 and 19) may be provided, inclined angularly downward at upper portions of the vertical members of the guide plates to check the movement of the severed fruit halves, whereupon the halves with their flat inner faces resting against the side plates slide down to a nearly horizontal position, where they rest as shown in dotted lines in Figs. 1 and 19 ready for the action of pushers 9 to advance them to the transfer holders or supports.

The pushers consist of metal strips 74 formed with U-bends at 75 so that their upper portions may move over the upper surfaces of the guide and supporting plates 6 and 70. The rearward ends of the upper portions of the pusher strips are up-curved forming the actual pushing elements 9 previously mentioned. The lower portions of the strips are bent angularly at 76 and are connected to a cross bar 77, forming a part of an oscillating frame 78 which is supported on a shaft 79 mounted in bearings in frame brackets 80. The pusher frame is oscillated by an arm 81 secured to shaft 79 and connected at its forward end to a vertical bar 82, which is fixed to the center of the reamer carriage (later described) so that as the carriage rises, the pusher frame is swung forward (toward the feed end of the machine) and when the reamer carriage descends, the pushers are moved rearward in the feeding direction as indicated by an arrow, Fig. 3 to push a row of fruit halves simultaneously from the supporting plates and on to the transfer holders which are at that time positioned adjacent the rear edges of the guide plates to receive them.

These transfer holders 7, as shown in Figs. 2, 3 and 6 and in detail in Figs. 16, 17 and 18, consist of plates 83 secured to other plates 84, which are in turn secured to the upper ends of stems 85. The plates 84 serve as drip guards and for this purpose have the drip extensions or flanges 86 Figs. 16 and 17 to direct juice dripping from the fruit halves while on the transfer holders from certain parts of the mechanism. The plates 84 also serve as convenient means for detachable mounting of the plates 83 which are the transfer supports proper. These supporting plates are detachably secured to the plates 84 as by screws 87 so that they may easily be removed and other plates substituted, as for example, in handling the fruits of different sizes or character, as for example, oranges or lemons. Each supporting plate 83 has at its rearward, rounded edge 88, check lugs 89 to receive the forward part of the periphery of a fruit-half positioned as shown in dotted lines in Figs. 16 and 18. At its forward edge, at the sides thereof, the plate also has guide lugs 90 spaced apart a distance slightly greater than the average diameter of the fruit halves. The plate also has drip apertures 91. The stems 85 reciprocate in sleeves 92 having ears 93 secured to a transverse angle bar 94 forming a part of the oscillating transfer frame, the side members 95 of which are pivotally mounted at 96 (Fig. 2) on stub shafts secured in the main frame members 14. Each stem has near its upper end an enlarged portion 97 (Fig. 16) forming a shoulder as one abutment for a helical spring 98 located in a counter-bore of the sleeve and urging the holder to upward position, as determined by a stop collar 99 adjustably secured on the lower end of the stem. Rotation of the stem and the supporting plate is prevented by a pin 100 screwed into the enlarged stem portion 97 and having a flattened portion 101 moving in a guide slot 102 in the upper end of the sleeve. Plate 84 is dished at 103 to surround the upper portion of the sleeve and stem and prevent juice from having access to these parts. The drip or guard flange 86 also has a portion 104 extending about its dished portion so that the stem mounting is fully protected from dripping juice. The transfer frame is oscillated by rollers 105 revoluly mounted on links 106 (Fig 2) which form a part of the reamer carriage reciprocating mechanism, as later described. The rollers 105 engage arcuate faces of cam blocks 107 secured to the side members 95 of the transfer frame.

It is desirable to provide additional means to prevent displacement of the fruit-halves from the transfer holders as they are moved to position thereon by the pushers 9. Such means consists of a cross rail 110 (Figs. 3 and 6) carried by side arms 111 and pivotally connected at 112 to bars or straps 113 secured to the main frame slide members. When the transfer holders are in receiving position as in Fig. 6, the check rail 110 is positioned to engage forward portions of the fruit-halves and properly locate or retain them on the transfer holders. This position of the rail is determined by the side arms 111 resting against the cross bar 94 of the transfer frame. The rail frame is urged to this position by springs 108 connected between the side arms and the side main frame members. As the transfer frame swings up and rearward to place the fruit-halves in the chucks the cross rail 110 moves to an idle position as shown in Figs. 2 and 3, where it does not interfere with the placement of the fruit-halves in the chucks.

Figure 5:
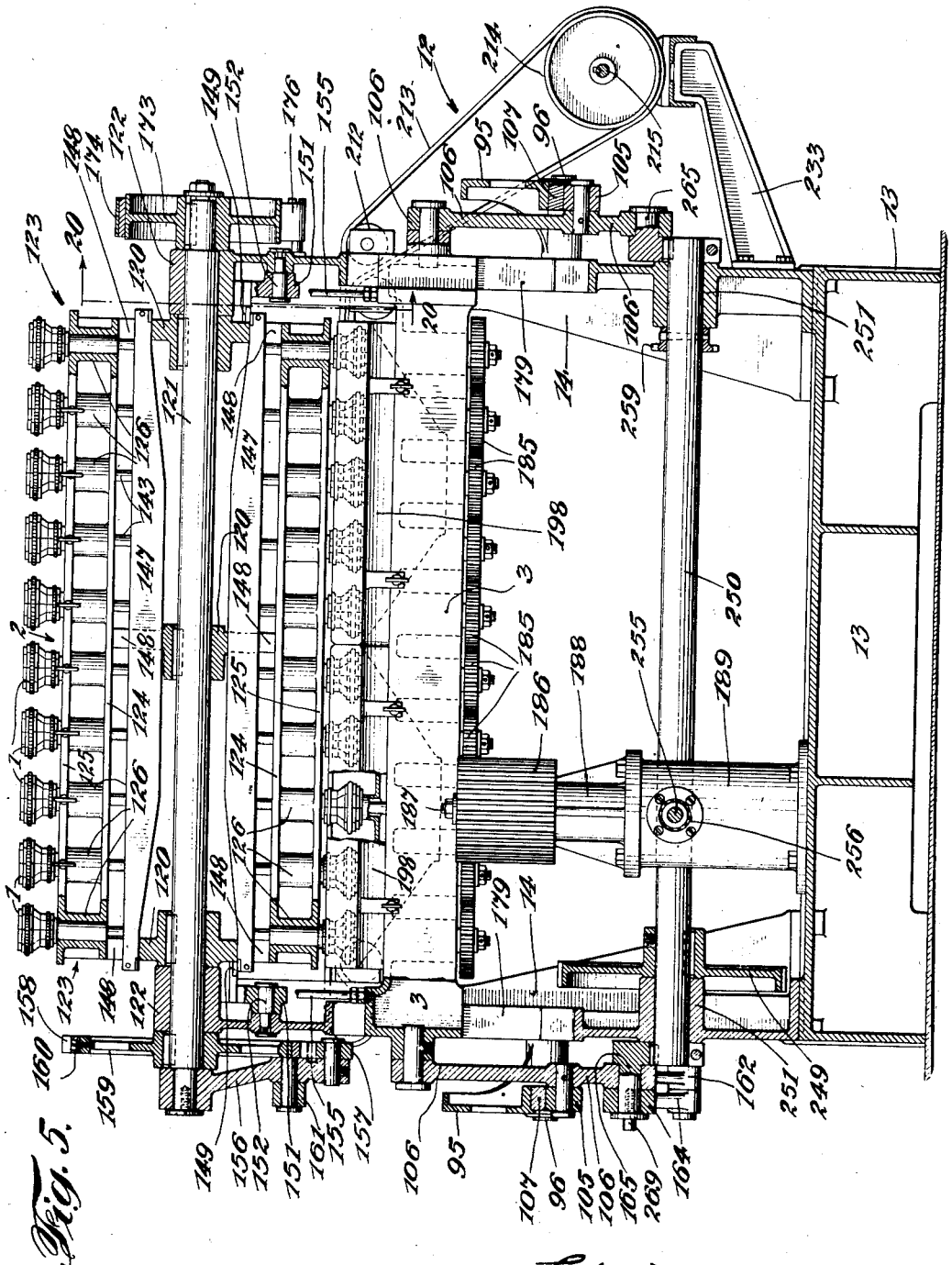
Fig. 5 is a section at 5—5, Fig. 2.

The chuck turret includes end plates 120 keyed on a shaft 121 (Fig. 5) which rotates in bearings 122 at the upper ends of the main frame side members. The chucks 1 which hold the fruit-halves for reaming are arranged in rows, uniformly spaced in the rows, and the rows are uniformly spaced in the circular direction of the turret. Any reasonable number of rows of chucks may be provided depending on the various speed ratios of the machine, or timing, or other factors of design. Each row of chucks is supported by a sleeve frame 123 consisting of inner and outer plates 124 and 125 and sleeves 126 connecting them. The ends of the sleeve frames are connected to the end plates 120, resting in sockets therein and held by clips 127 and screw 128, Fig. 6. Each chuck, Figs. 11 to 13, includes a sleeve or support 129 (Fig. 11) for the chuck proper, this being inserted in one of the frame sleeves 126 and secured, as by a thumb screw 130, entering a hole in the chuck sleeve, to prevent rotation, and also permitting the chucks to be removed easily and others inserted as for example in adapting the machine for handling lemons instead of oranges. The form of the chuck fingers and dimensions of the fingers and chuck in general may be varied to adapt the chuck for holding lemons, grapefruit, or oranges, or for different sizes of the various fruits. Near the lower end, sleeve 129 has a number of peripheral channels or sockets 131 of half-round section. The chuck fingers 132 have rounded upper end portions or lugs 133 fitting in the channels. Below the rounded portion, each finger has a flat or plane portion 134 (Fig. 13) normally resting against the flat or plane lower end of the sleeve or supporting body. The lower portions 135 of the chuck fingers are curved in generally part-spherical form and may be apertured or slotted as at 136 to increase gripping power against rotation of the fruit while being reamed. The fingers are normally retained in inward or closed position with their side edges in contact, by a helical spring 137 located in an upper channel 138 consisting of segmental channel portions in the upper ends of the fingers opposite the rounded members 133, and another helical spring 139 located in a similarly formed lower channel 140 adjacent the lower ends of the fingers. Rotation of the group of fingers on the sleeve or body is prevented, by the socket formations 131 and by a pin 141 (Fig. 12) passing through a hole in one of the fingers and fixed in the lower portion of the sleeve. Each chuck also includes a positive ejector for the reamed skin. This comprises a cupped disk 142 located in the upper portion of the chuck socket (as viewed in Fig. 11) and carried by the outer end of a stem 143 which reciprocates in sleeve 129, having at its inward end a collar 144 running in the sleeve counter-bore and secured by a pin 145. A helical spring 146 about the stem within the sleeve engages the lower end of the sleeve counter-bore and collar 144 to normally retain the ejector in retracted position, as shown in Fig. 11. The ejectors of each row of chucks are simultaneously operated by an ejector bar 147 moving in radial slots 148 (Figs. 5 and 6) in the turret end plates 120. When the chucks are in ejecting position at 11, Fig. 6, the ends of the corresponding ejector bar extending beyond the end plates are brought into cooperative relation to the ends of flanges 149 (see also Figs. 20 and 21), projecting inward (toward the center of the machine) from the ends of arms 150 of bell cranks 151 fulcrumed at 152 on the main frame side members. The bell cranks are normally held in retracted position, Fig. 21, by springs 153 connected between their arms 154 and the main frame. As the turret is rotated to bring a row of chucks to ejecting position, the ejector bars move in an arc outside the bell crank flanges 149. In ejecting position, as above referred to, the bar ends are opposite the ends of flanges 149, and the bell cranks are then operated by rods 155 secured to the reamer carriage. As the carriage rises, these rods act on bell crank arms 154 (Fig. 20), and oscillate the bell cranks so that the ends of flanges 149 engage the ends of the ejector bar and the bar acts simultaneously on all the ejector stems 143 to positively eject the reamed skins, which fall upon the carry-off belt 12, above and later referred to.

The turret is intermittently rotated by mechanism including a pawl arm 156 arranged to oscillate one end of shaft 121 and having a pawl 157 (see Figs. 2 and 5) the toe of which engages notches 158 in the periphery of a wheel 159 secured on shaft 121, the notch spacing being the same as that of the chuck rows. Desirably the notches are formed in separate hardened blocks 160 detachably inserted in the wheel.

The pawl arm is oscillated at the proper times by an adjustable link 161 pivotally connected to the arm and to one end of a rock lever 162 which is fulcrumed at 163 on one of the main frame side members. The lower end of the lever is connected by a link 164 to a crank 165 which is operated, as later described, to move the turret and also to operate the reamer carriage. Positive indexing or locking mechanism is also preferably provided. This includes a rock lever 166 (Fig. 2) fulcrumed at 167 on a main frame side member. The long arm of the lever has a tooth 168 of bevelled or tapered form to accurately fit the tapered notch formations of the turret indexing wheel 159, and the tooth normally moves to engagement with the notch by the action of a spring 169, tensioned between the short arm 170 of the lever and the main frame. At its end, the long arm of the lever has a lateral flange 171 providing a flat face, which, toward the end of a counter-clockwise movement of the pawl arm 156 (as viewed in Fig. 2) is engaged by an end portion of the pawl arm, whereupon the lever and its tooth are retracted, the turret feed pawl 157 is thereupon urged by its spring 172 to engage in the lowermost notch of the turret wheel 159 as the pawl arm moves clockwise and while the stop tooth 168 is still in retracted position. The turret is thus advanced to position an empty row of chucks at 8, Fig. 6, to receive fruit-halves from the transfer holders and on reaching that position, the stop tooth 168 enters the corresponding turret notch and locks the turret in accurately registered position in relation to the transfer holders and fruit-halves thereon. At the same time by the described action, a row of chucks with the fruit-halves therein, inserted by the previous action of the transfer mechanism, is located in the lower position of the turret for the action of the reamers, and the row of chucks containing previously reamed skins is located for ejection of the skins, as above described.

Figure 4:
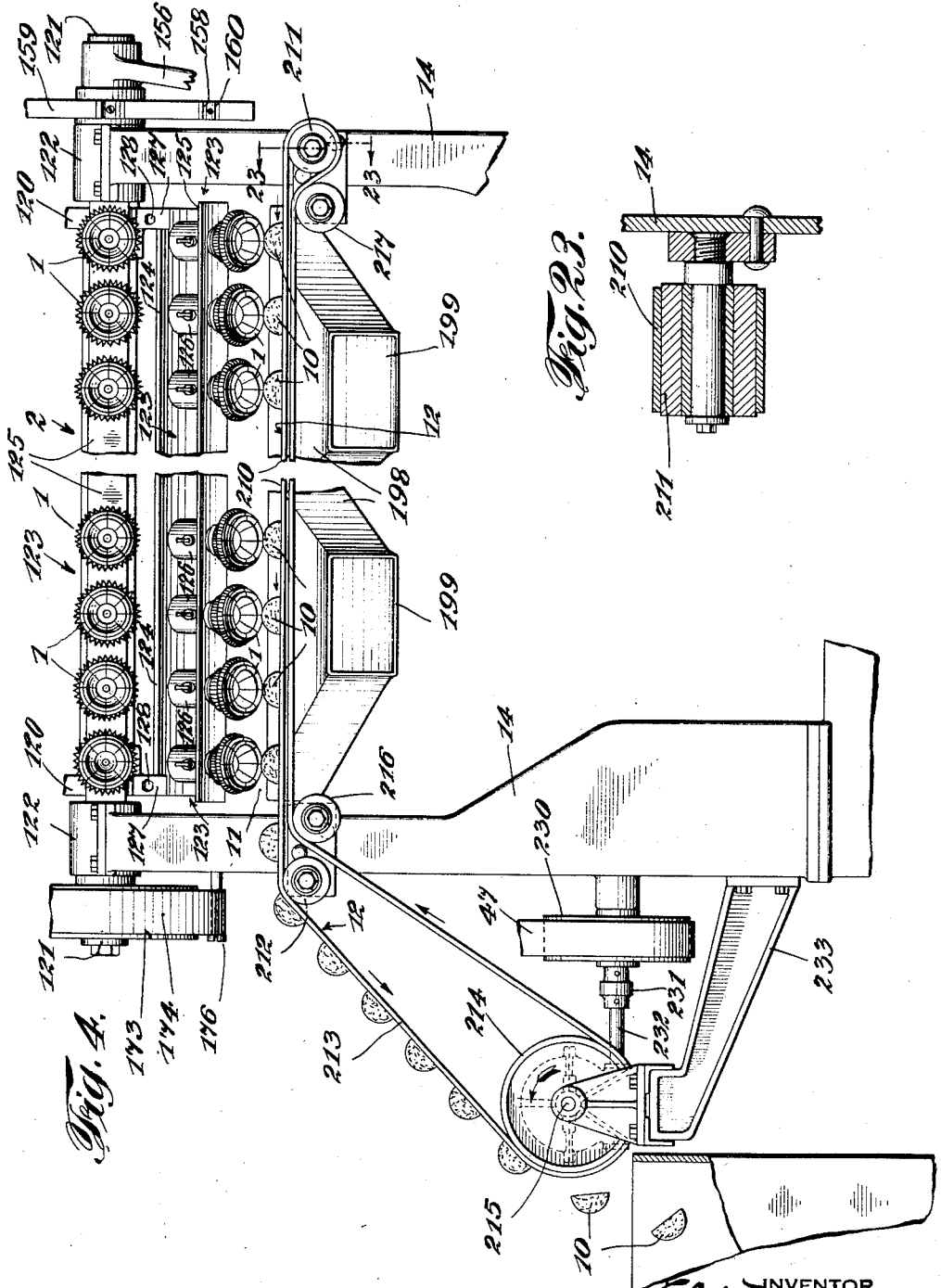
Fig. 4 is a partial rear elevation, that is, looking toward the discharge end of the machine.

To properly steady the turret movement and especially to prevent overstroke or undue shock on the detent tooth 168, a friction brake is preferably applied to the turret. This consists of a brake drum 173 (Figs. 3, 4, and 5) on turret shaft 121, and a brake strap 174 with a friction liner 175, connected to the frame at 176 and having its other end connected by an adjustable link or turn-buckle 177 to a spring 178 which is also connected to the main frame, to apply desired friction to the drum.

As the reamer carriage rises for the reaming action, the transfer frame is operated in a manner already referred to, and a row of fruit-halves positioned on the transfer holders is moved up and the convex portions of the fruits are forced into the chucks, the fingers 132 of which yield outward to receive and firmly grip the fruits, which are then irrevolubly held with their cut faces exposed, ready for reaming after the turret is advanced one step.

The reamer carriage body 3 has at its ends flanges cooperating with guides formed at the sides of guide slots 179 (Fig. 5) in the main frame side members. The reamers are arranged in the carriage with spacing corresponding to that of the chucks. Each reamer, Figs. 14 and 15 includes a shaft 180 mounted in bearings, preferably ball bearings 181 and 182. The bearing arrangement may be in accordance with standard practice, except that provision is made for effective packing of the shaft where it emerges from the carriage or bearing housing, as at 183, to prevent any access of juice to the bearings. A lower packing 184 is also preferably provided to prevent escape of oil. While the reamers might in some cases be all driven in the same direction, this is not necessary since the reaming ribs or equivalent formations may be so made that they operate equally well when the reamer head turns either way. This simplifies the driving connections of the reamer shafts, which are all driven from one shaft (or gear thereon) by intermeshing gears 185 secured on the lower ends of all the shafts. One of these gears engages a main driving gear 186 (Figs. 1 and 5), having a wide face in the vertical direction, so that the driven gear 185 remains in mesh with it during the vertical travel of the carriage. This primary driving gear 186 for the reamers is hollow (Fig. 6) and it is mounted on the upper end of a shaft 187 which runs in bearings in a sleeve 188 supported by another large sleeve or box 189 secured to the frame base 13. The means for driving shaft 187 is referred to later.

A reamer head 190 is mounted on the upper end of each shaft 180. The head is in dished or approximately semispherical form for oranges or other approximately spherical fruits, or in the case of lemons, it may have an elongated or semi-ovate form as especially shown at 190ª in Figs. 26 and 27.

The outer face of the reamer has pyramidal or V-shaped ribs as the active reaming elements. There may be a number of long ribs 191 extending from the center to the periphery, and intermediate shorter ribs 192. The rib arrangement may be varied considerably. The provision of short ribs intermediate the long one however allows for the better discharge of juice and pulp. The head has a central sleeve or hub formation 193 including an inner squared portion 194 fitting the squared end portion 195 of the shaft to cause the head to rotate therewith. Vertical adjustment to accurately adjust the individual reamer head in relation to the corresponding chuck is provided by a screw 196 inserted in the upper end of the shaft and secured by a lock nut 197. The screw head engages the upper end of the socket formation in the head hub 193. It is unnecessary to positively secure the heads in position. They may therefore be easily removed and other heads put on, as for example, in adapting a machine for handling lemons instead of oranges.

The reamer heads may be constantly rotated at high speed. After a row of fruit-halves has been positioned above them, as above described, the carriage is raised (by means to be described); the reamer heads are brought into contact with the fruit pulps and the pulp and juice is rapidly extracted. Finally the reamer heads reach the position of Fig. 14, whereupon practically all of the juice and pulp has been extracted without removing any, or any appreciable part of the pectin or white fibrous lining of the skin. The adjustment of the reamer heads as above referred to provides for very accurate spacing of the heads in relation to the chucks, or in other words provides for a clearance between the reamer and the chuck practically equal to the average thickness of the fruit skin, so that accurate and complete removal of the pulp and juice is insured.

The extracted pulp and juice is caught by one or more troughs 198 secured to the upper portion of the reamer carriage. The open, upward portions of the troughs surround the reamers and chucks during reaming and catch all juice and pulp which is driven off centrifugally. Each trough has a spout portion 199 (Figs. 4 and 6) extending laterally to convenient point where juice and pulp are discharged into a tub or upper end of a conduit (not shown) leading to a convenient point for further handling.

The reamer construction above described and especially the manner of mounting the reaming head on its shaft does not provide for any yield or relative vertical motion of the head in the upward movement of the carriage. It is desirable in some cases, as for example, to allow for varying thickness of the fruit skins, etc., to mount the reamer head for yielding vertical movement in relation to its shaft. Such an arrangement is shown in Fig. 24, in which the shaft 180ª has a central bore 200 to receive a pin 201 which is urged upward by a helical spring 202 within a counter-bore of the shaft and held in position by a screw 203. The spring engages a head 204 on the lower end of the stem, which engages a shoulder 205 in the shaft to limit the upward movement of the pin. The reamer head is mounted on the shaft end substantially as previously described, that is, it has in the lower end of its hub a square socket formation 194 slidably engaging a squared portion 195 of the shaft, and above that a cylindrical portion slidably engaging the cylindrical shaft end. Downward movement of the head upon the shaft is limited by a shoulder 206 in the head socket or hub formation engaging a shoulder on the shaft. Normally, the head is held in an upward position as shown in Fig. 24, and as it rises and contacts with the fruit it is yieldingly maintained in upward position until all the pulp and juice are extracted, and then if the skin is of unusual thickness, the head is correspondingly depressed in relation to the shaft and against the force of spring 202; or if the skin is thinner, the head is maintained in an elevated position by the spring to the end of the upward carriage movement. Provision is thus made for accurate reaming of fruits of different vertical dimensions or skin thicknesses, without risk of injury to the machine or removal of any, or any appreciable amount of the white skin lining.

The carry-off belt (Fig. 4) has an upper horizontal active stretch 210 extending between pulleys 211 and 212, revolubly mounted on the main frame. From pulley 212, the active stretch of the belt slants downward as at 213 to a discharge point where the reamed skins are discharged into a tub, or otherwise disposed of, The belt passes about a drive pulley 214 on a shaft 215, and the retain stretch of the belt passes over idle pulleys 216 and 217 on the main frame.

The main driving means or mechanism and connections to the various major parts of the machine will now be described:

Any suitable initial drive may be used. Preferably, in most cases, the machine is arranged for individual motor drive. The motor 218 is mounted on a frame base extension 219. The motor shaft 220 is connected by a sleeve coupling 221 (Fig. 7) to a shaft 222 which passes through a sleeve 223 to protect it and its bearings from juice. The shaft runs in bearings, preferably ball bearings 224 in bearing housings 225, and 229 secured to the main frame. At the end of shaft 222 remote from the motor it has a pinion 226 (Figs. 1 and 3) engaging a gear 227, on a shaft 228, running in bearings in a gear box 229, which encloses the gears. This shaft carries a pulley 230 which is the driving pulley for belt 47 above referred to, which drives the knife shaft. Shaft 228 is also connected by a coupling 231 to another shaft 232 (Figs. 1 and 3) which drives by worm or other suitable gearing, shaft 215, which carries the driving pulley 214 of the carry-off conveyor. This shaft is supported in bearings carried by a frame extension 233.

The motor shaft has, adjacent coupling 221, a pinion 234 (Fig. 7) engaging an idler gear 235 carried by an arm 236 arranged to oscillate on a sleeve 237 secured to the main frame. The swinging idler 235 allows substitution of other pinions, to change the drive ratio. The idler gear engages a gear 238 revolubly mounted on a counter-shaft 239. This gear is connected to the shaft by a shiftable clutch 240 operated by a lever 241 (Fig. 1) fulcrumed at 242. The upper end of the lever is connected to a rod 243 which extends across the machine and has at the other side of the machine a handle 244 convenient to the operator. By movement of the clutch, the operation of all of the machine except the knife shaft of the carry-off conveyor is controlled. By other arrangements, the knife shaft and carry-off conveyor can be controlled independently or simultaneously with the starting and stopping of the machine as a whole, but usually, it is unnecessary to stop the knife shaft and carry-off belt during brief stoppages of the remainder of the machine for adjustment or attention to misplaced fruits, etc.

Counter-shaft 239 (Fig. 7) has a pinion 245 engaging a gear 246 on a stub shaft 247. On this shaft also is a pinion 248 engaging a large gear 249 on a counter-shaft 250 which extends across the machine, being mounted in bearings 251 in the main frame side members. At each end, this shaft carries one of the cranks 165 above mentioned. At each side of the machine, the link 106 above referred to which operates the reamer carriage is connected to the pin of the corresponding crank. These links, as also above stated, also carry the rollers 105 which operate the transfer frame, so that the reamer carriage and transfer frame 7 are both driven from the cranks 165. At one side of the machine, link 164 which operates the rock lever 162 of the chuck turret driving mechanism is also connected to the corresponding crank 165, so that the turret is primarily driven from this crank in properly timed relation to the movement of the reamer carriage and transfer mechanism.

In some cases, the reamers may be separately driven by a motor or other driving means distinct from the motor 218 or other driver which operates other parts of the mechanism. In the present arrangement however, the reamers are driven from the motor 218 through shaft 222 by a bevel gear 252 (Fig. 6) on the shaft at an intermediate point thereof and located in a gear box 253. Gear 252 drives another gear 254 on a shaft 255 mounted in bearings 256, and this shaft has on its inward end a bevel gear 257, engaging a gear 258 on the lower end of the main reamer drive shaft 187 above referred to.

The shaft 250 has at an intermediate point a sprocket 259 driving a chain 260 which in turn drives a sprocket 261 on a shaft 262, Figs. 3 and 6. This shaft has at one end a sprocket 263 which drives the chain 38 previously referred to, this chain being the drive for the feed conveyor belts and cutting support shaft. An intermediate portion of the chain passes over an idler 264 for proper tensioning or adjustment.

It is usually desirable to provide automatic stop mechanism for throwing out clutch 240 (Fig. 7) in case of certain possible derangements of the machine, such for example as derangement or breakage of some part of the turret driving mechanism. Such derangement or breakage might result in the turret moving less than the proper distance, which would bring its chuck out of register with the reamers or transfer mechanism and cause serious additional damage. For this purpose, I provide a vertical shaft 265 (Fig. 2) mounted to oscillate and also to reciprocate in bearings 266 on the main frame. At its upper end, (Fig. 22) this shaft has an arm 267 engaging behind the flange 171 of turret detent lever 166 above referred to. At its lower end the rock shaft has an arm 268 adapted to swing into or away from the path of movement of a stud 269 on the end of the crank 165 at that side of the machine. At an intermediate point, shaft 265 has a collar 270. Adjacent the shaft a lever 271 is fulcrumed on a frame bracket 272. This lever has a pin 273 resting above collar 270 on the shaft, and another pin 274 extending in the opposite direction and adapted when the lever is moved to the position shown in dotted lines in Fig. 1, to engage the clutch lever 241, move it and release the clutch. Shaft 265 is acted on by a spring 275 tensioned between a short arm 276 on the shaft and the main frame, so that shaft arm 267 is held in contact with flange 171 of the turret index lever. Thus every time that the index lever is retracted by the action of pawl arm 166, the rock shaft 265 is oscillated and its lower arm 268 is swung into the path of the stud 269 on crank 165. If for any reason the turret does not complete its proper movement after withdrawal of the detent tooth, the tooth continues to rest on the periphery of the turret end plate, and arm 268 is retained in the path of the crank stud 269, which thereupon strikes the arm and raises the shaft. Collar 270 thereupon acts on pin 273 to oscillate lever 271 and pin 274 operates the clutch lever to release the clutch and stop the machine, and especially to stop the turret driving and transfer frame operating mechanism and prevent injury to the machine. When the difficulty causing improper turret motion is remedied and the turret again properly indexed, the detent tooth will properly reenter the corresponding turret notch, arm 268 on the rock shaft is retracted from the path of the crank stud and the drive continues in the normal way. In every normal action of the turret driving mechanism, the safety clutch operating mechanism is moved to an active or safety position, and if the turret movement is properly completed, it is restored to normal or inactive position before it can operate to release the clutch.

I claim:

1. A fruit juice extracting machine comprising a turret, a plurality of fruit piece supporting chucks thereon in circular arrangement, means for rotating the turret step-by-step, a carriage movable toward and from the turret, extracting means on the carriage to cooperate with the pulp of fruit pieces supported by the chucks, means for positively ejecting skins from the chucks after extraction, and means to actuate said ejecting means while the turret is at rest.

2. A fruit juice extracting machine comprising a turret, a plurality of fruit piece supporting chucks thereon in circular arrangement, means for rotating the turret step-by-step, a carriage movable toward and from the turret, extracting means on the carriage to cooperate with the pulp of fruit pieces supported by the chucks, means for moving the carriage in coordination with the turret movements, transfer means for receiving fruit pieces and inserting them in the chucks at a position anterior to extracting position, a rotary cutter, means for presenting whole fruit to the cutter, and means for delivering cut pieces to the transfer means.

3. A fruit juice extracting machine comprising a turret, a plurality of rows of fruit piece supporting chucks thereon, means for rotating the turret step-by-step, a carriage movable toward and from the turret, extracting means on the carriage to cooperate with the pulp of fruit pieces supported by the chucks, means for positively ejecting skins from the chucks after extraction, and means to actuate said ejecting means while the turret is at rest.

4. A fruit juice extracting machine comprising a turret, a plurality of rows of fruit piece supporting chucks thereon, means for rotating the turret, step-by-step, a carriage movable toward and from the turret, extracting means on the carriage to cooperate with the pulp of fruit pieces supported by the chucks, a rotary cutter for severing fruit into halves, means for presenting whole fruits to the cutter, transfer means for transferring the fruit halves to the chucks, and means for delivering the fruit halves from the cutter to the transfer means.

5. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters to sever them in halves, and transfer mechanism operable to receive the fruit halves and transfer them to a row of chucks at a position anterior to reaming position.

6. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters which sever them in halves, guides adjacent the knives and arranged to direct fruit-halves downward and support them in approximately horizontal position with the cut faces down, and transfer mechanism for carrying the fruit-halves to the chucks.

7. A fruit juice extracting machine comprising a rotary turret, a plurality of rows of chucks thereon, a reamer carriage, means for moving the carriage toward and from a row of turret chucks, and a plurality of rotary reamers on the carriage positioned to engage fruit pieces carried by the chucks, a row of rotary cutters anterior to the turret, means for supporting and advancing whole fruits in rows past the cutters which sever them in halves, guides adjacent the cutters and arranged to direct fruit-halves downward and support them in approximately horizontal position with the cut faces down, transfer mechanism for carrying the fruit-halves to the chucks, and positively acting means for moving the fruit-halves from the guide means to the transfer mechanism.

8. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters which sever them in halves, guides adjacent the cutters and arranged to direct fruit-halves downward and support them in approximately horizontal position with the cut faces down, and transfer mechanism for carrying the fruit-halves to the chucks, the transfer mechanism comprising an oscillating frame and a plurality of fruit holders thereon.

9. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters which sever them in halves, guide means adjacent the cutters and arranged to direct fruit-halves downward and support them in approximately horizontal position with the cut faces down, transfer mechanism for carrying the fruit halves to the chucks, and positively acting means for moving the fruit-halves from the guide means to the transfer mechanism, the transfer mechanism comprising an oscillating frame and a plurality of fruit holders thereon.

10. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters which sever them in halves, guides adjacent the cutters and arranged to direct fruit-halves downward and support them in approximately horizontal position with the cut faces down, transfer mechanism for carrying the fruit-halves to the chucks, the transfer mechanism comprising an oscillating frame and a plurality of fruit holders thereon, and a stop rail cooperating with fruit-halves on the holders.

11. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters which sever them in halves, guide adjacent the cutters and arranged to direct fruit-halves downward and support them in approximately horizontal position with the cut faces down, transfer mechanism for carrying the fruit-halves to the chucks, the transfer mechanism comprising an oscillating frame and a plurality of fruit holders thereon, a stop rail cooperating with fruit-halves on the holders, and means for retracting the stop rail from active relation to the fruits as the transfer frame moves to place the fruits in the chucks.

12. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, a row of rotary cutting supports adjacent the cutters each including an annular series of pockets to receive and move whole fruits past the corresponding cutter to bisect the fruit, and means to transfer the fruit halves to the chucks.

13. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, a row of rotary cutters anterior to the turret, means for supporting and advancing whole fruits in rows past the cutters which sever them in halves, transfer mechanism for supplying the fruit halves to a row of chucks at a position anterior to reaming position, main driving means including a clutch and connections to drive the turret and transfer mechanism, and means acting upon improper movement of the turret to throw out the clutch.

14. A fruit juice extracting machine comprising a rotary turret, a plurality of rows of chucks thereon, a reamer carriage, means for moving the carriage toward and from a row of turret chucks, a plurality of rotary reamers on the carriage positioned to engage fruit pieces carried by the chucks, the chucks including skin ejectors, a plurality of ejector bars movably mounted in the turret, one for each row of chucks, and means acting at a turret position posterior to reaming position to operate one of the ejector bars and eject skins from a row of chucks.

15. A fruit juice extracting machine comprising a rotary turret, a plurality of rows of chucks thereon, a reamer carriage, means for moving the carriage toward and from a row of turret chucks, and a plurality of rotary reamers on the carriage positioned to engage fruit pieces carried by the chucks, the chucks including skin ejectors, a plurality of ejector bars movably mounted in the turret, one for each row of chucks, and means acting at a turret position posterior to reaming position to operate one of the ejector bars and eject skins from a row of chucks, and a carry-off belt arranged to receive ejected skins.

16. Fruit juice extracting mechanism comprising a turret; fruit holding chucks thereon; means for rotating the turret step-by-step including a pawl arm and pawl; a reamer carriage; reamers thereon; transfer mechanism including a swinging frame and fruit holders thereon; driving mechanism including a primary driver, a clutch, and means beyond the clutch for driving the pawl arm, reamer carriage and transfer frame; and a toothed detent arm cooperating with the turret and actuated by said pawl arm.

17. Fruit juice extracting mechanism comprising a turret; fruit holding chucks thereon; means for rotating the turret step-by-step including a pawl arm and pawl; a reamer carriage; reamers thereon; transfer mechanism including a swinging frame and fruit holders thereon; driving mechanism including a primary driver, a clutch, and means beyond the clutch for driving the pawl arm, reamer carriage and transfer frame; a toothed detent arm cooperating with the turret and actuated by said pawl arm; and safety stop mechanism controlled by the detent arm and acting upon improper turret movement to throw out the clutch.

18. Fruit juice extracting mechanism comprising a turret; fruit holding chucks thereon; means for rotating the turret step-by-step including a pawl arm and pawl; a reamer carriage; reamers thereon; transfer mechanism including a swinging frame and fruit holders thereon; driving mechanism including a primary driver, a clutch, and means beyond the clutch for driving the pawl arm, reamer carriage and transfer frame; and a toothed detent arm cooperating with the turret and actuated by said pawl arm, the turret having circularly spaced notches for cooperation with the pawl and the tooth on the detent arm to index the turret.

19. Fruit juice extracting mechanism comprising a turret; fruit holding chucks thereon; means for rotating the turret step-by-step including a pawl arm and pawl; a reamer carriage; reamers thereon; transfer mechanism including a swinging frame and fruit holders thereon; driving mechanism including a primary driver, a clutch, and means beyond the clutch for driving the pawl arm, reamer carriage and transfer frame; a toothed detent arm cooperating with the turret and actuated by said pawl arm; and safety stop mechanism controlled by the detent arm and acting upon improper turret movement to throw out the clutch, the turret having circularly spaced notches for cooperation with the pawl and the tooth on the detent arm.

20. In a fruit juice extractor, in combination with extracting means, transfer means for moving fruit pieces to the extracting means, rotary cutters, guides for directing the movement of cut fruit pieces from the cutters and including plates for directing the fruit pieces from vertical to horizontal position, and positive means operative to push the fruit pieces laterally from horizontal portions of the guides to the transfer means.

21. In a fruit juice extractor, in combination with extracting means, transfer means for moving fruit pieces to the extracting means, cutters, guides for directing the movement of cut fruit pieces from the cutters and including plates for directing the fruit pieces from vertical to approximately horizontal position, and a swinging frame and pushers thereon to engage fruit pieces supported by the guides and slide them positively to the transfer means.

22. In a fruit juice extractor, a reamer adapted for cooperation with a fruit half supported for reaming and comprising a supporting body, a shaft revolubly mounted therein, a reamer head on the shaft, and an adjustable stop screw threaded longitudinally into the end of the shaft for adjusting the head longitudinally in relation to the shaft.

23. A fruit juice extracting machine comprising a rotary turret, a plurality of rows of fruit chucks thereon, a reamer carriage arranged for reciprocation below the turret, a row of rotary reamers thereon, means for rotating the turret step-by-step and means for raising and lowering the reamer carriage in timed relation with the rotation of the turret.

24. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the rotation of the turret, a transfer frame, a plurality of transfer supports thereon, means to supply fruit to said supports, and means for oscillating the transfer frame in timed relation with the turret movement to seat the fruit in said chucks.

25. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the rotation of the turret, a transfer frame, a plurality of transfer supports thereon, fruit guiding and supporting means anterior to the transfer frame operative to supply fruit to said supports, said guiding and supporting means including plates having vertical, curved and horizontal portions, and means to oscillate the transfer frame in timed relation with the turret movement to seat the fruit in said chucks.

26. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the movement of the turret, a transfer frame, a plurality of transfer supports thereon, means for oscillating the transfer frame in timed relation with the turret movement, fruit guiding and supporting means anterior to the transfer means, said guiding and supporting means including plates having vertical curved and horizontal portions, a pusher frame, means for operating it in timed relation with movements of the transfer frame, and pushers on the pusher frame moving over the horizontal portions of the guide plates to positively transfer fruit pieces to the holders of the transfer mechanism.

27. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the movement of the turret, a transfer frame, a plurality of transfer supports thereon, means for oscillating the transfer frame in timed relation with the turret movement, fruit guiding and supporting means anterior to the transfer means, said guiding and supporting means including plates having vertical curved and horizontal portions, a row of circular knives adjacent the vertical portions of the guide plates, and rotary cutting supports having central annular channels accommodating segments of the knives and vertical portions of the guide plates.

28. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the movement of the turret, a transfer frame, a plurality of transfer supports thereon, means for oscillating the transfer frame in timed relation with the turret movement, fruit guiding and supporting means anterior to the transfer means, said guiding and supporting means including plates having vertical curved and horizontal portions, a row of circular knives adjacent the vertical portions of the guide plates, and rotary cutting supports having central annular channels accommodating segments of the knives and vertical portions of the guide plates, the cutting supports having pockets to receive whole fruits and move them past the knives and deliver the cut pieces to the guide plates.

29. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the movement of the turret, a transfer frame, a plurality of transfer supports thereon, means for oscillating the transfer frame in timed relation with the turret movement, fruit guiding and supporting means anterior to the transfer means, said guiding and supporting means including plates having vertical curved and horizontal portions, a row of circular knives adjacent the vertical portions of the guide plates, rotary cutting supports having central annular channels accommodating segments of the knives and vertical portions of the guide plates, the cutting supports having pockets to receive whole fruits and move them past the knives and deliver the cut pieces to the guide plates, and feed means anterior to the cutting supports to deliver whole fruits successively to the support pockets.

30. A fruit juice extracting machine comprising a turret, a plurality of fruit piece supporting chucks thereon in circular arrangement, means for rotating the turret step-by-step, a carriage movable from beneath toward and away from the turret, extracting means on the carriage to cooperate with the pulp of fruit pieces supported by the chucks, and a juice trough carried by the reamer carriage and having a portion surrounding the extractors to catch juice and a lateral spout for juice delivery.

31. A fruit juice extracting machine comprising a rotary turret, a plurality of rows of fruit chucks thereon, a reamer carriage arranged for reciprocation below the turret, a row of rotary reamers thereon, means for rotating the turret step-by-step, means for raising and lowering the reamer carriage in timed relation with the rotation of the turret, a transfer frame, a plurality of transfer supports thereon and yieldingly mounted, and means for oscillating the transfer frame in timed relation with the turret movement.

ELOF NORDSTROM.